United States Patent
Kraft

(10) Patent No.: US 11,242,799 B2
(45) Date of Patent: Feb. 8, 2022

(54) AIR LOGIC CONTROL FOR AUXILIARY AIR INJECTION SYSTEM

(71) Applicant: POWERPHASE LLC, Jupiter, FL (US)

(72) Inventor: Robert J. Kraft, Tequesta, FL (US)

(73) Assignee: Powerphase International, LLC, Hobe Sound, FL (US)

( * ) Notice: Subject to any disclaimer, the term of this patent is extended or adjusted under 35 U.S.C. 154(b) by 484 days.

(21) Appl. No.: 15/836,488

(22) Filed: Dec. 8, 2017

(65) Prior Publication Data
US 2018/0163626 A1 Jun. 14, 2018

Related U.S. Application Data

(60) Provisional application No. 62/432,378, filed on Dec. 9, 2016.

(51) Int. Cl.
| | | |
|---|---|---|
| F02C 7/08 | (2006.01) | |
| F02C 9/28 | (2006.01) | |
| F01K 23/10 | (2006.01) | |
| F02C 7/26 | (2006.01) | |
| F02C 9/16 | (2006.01) | |
| F01K 21/04 | (2006.01) | |
| F02C 3/30 | (2006.01) | |
| F01D 19/00 | (2006.01) | |
| F02C 6/00 | (2006.01) | |
| F01D 15/08 | (2006.01) | |

(52) U.S. Cl.
CPC ............... *F02C 7/08* (2013.01); *F01D 15/08* (2013.01); *F01D 19/00* (2013.01); *F01K 21/04* (2013.01); *F01K 21/047* (2013.01); *F01K 23/10* (2013.01); *F01K 23/101* (2013.01); *F02C 3/305* (2013.01); *F02C 6/00* (2013.01); *F02C 7/26* (2013.01); *F02C 9/16* (2013.01); *F02C 9/28* (2013.01); *F05D 2260/42* (2013.01); *F05D 2260/85* (2013.01); *Y02E 20/16* (2013.01)

(58) Field of Classification Search
CPC ...... F02C 6/00; F02C 7/08; F02C 7/10; F02C 7/26; F02C 9/16; F02C 3/30; F02C 3/305; F02C 3/34; F02C 6/06; F01K 23/02; F01K 23/10; F01K 23/101; F01K 21/047; F01D 19/00; F05D 2260/85
See application file for complete search history.

(56) References Cited

U.S. PATENT DOCUMENTS

| | | | |
|---|---|---|---|
| 4,683,715 A * | 8/1987 | Iizuka | F02C 7/26 60/39.41 |
| 5,447,059 A | 9/1995 | Miller et al. | |
| 6,038,849 A * | 3/2000 | Nakhamkin | F02C 6/06 60/775 |
| 6,481,212 B2 | 11/2002 | Priestley | |

(Continued)

OTHER PUBLICATIONS

International Search Report and Written Opinion for International Patent Application No. PCT/US2017/065245, dated Apr. 12, 2018, 14 pages.

*Primary Examiner* — Alain Chau
(74) *Attorney, Agent, or Firm* — Avek IP

(57) ABSTRACT

The invention relates generally to gas turbine engines used for electrical power generation. More specifically, embodiments of the present invention provide systems and ways for improving the life and reducing start-up time necessary for bringing gas turbine engines online and up to full power.

11 Claims, 4 Drawing Sheets

(56) References Cited

U.S. PATENT DOCUMENTS

| | | | |
|---|---|---|---|
| 6,499,303 B1* | 12/2002 | Polukort | F01K 23/10 60/39.182 |
| 7,107,774 B2* | 9/2006 | Radovich | F01K 13/02 122/7 B |
| 8,096,747 B2 | 1/2012 | Sengar et al. | |
| 8,141,360 B1* | 3/2012 | Huber | B60K 6/24 60/606 |
| 8,875,483 B2 | 11/2014 | Wettstein | |
| 9,388,737 B2 | 7/2016 | Kraft | |
| 9,695,749 B2 | 7/2017 | Kraft | |
| 9,765,693 B2 | 9/2017 | Kraft et al. | |
| 9,777,630 B2 | 10/2017 | Kraft et al. | |
| 9,803,548 B2 | 10/2017 | Kraft et al. | |
| 9,890,707 B2 | 2/2018 | Kraft et al. | |
| 10,145,303 B2* | 12/2018 | Kraft | F02C 6/16 |
| 10,267,185 B2* | 4/2019 | Jordan, Jr. | F01K 23/065 |
| 10,907,511 B2* | 2/2021 | Yanosik | F01K 13/02 |
| 2005/0034445 A1* | 2/2005 | Radovich | F01K 23/10 60/39.182 |
| 2007/0006592 A1* | 1/2007 | Balan | F02C 3/34 60/772 |
| 2014/0250902 A1 | 9/2014 | Kraft | |
| 2014/0352318 A1 | 12/2014 | Kraft | |
| 2014/0366547 A1* | 12/2014 | Kraft | F02B 29/0443 60/772 |
| 2014/0373551 A1* | 12/2014 | Kraft | F01K 23/02 60/772 |
| 2015/0233296 A1 | 8/2015 | Kraft | |
| 2015/0240713 A1* | 8/2015 | Kraft | F02C 9/18 60/774 |
| 2015/0240719 A1* | 8/2015 | Kraft | F01D 15/10 290/52 |
| 2016/0130982 A1 | 5/2016 | Kraft et al. | |
| 2016/0273397 A1 | 9/2016 | Ekanayake et al. | |
| 2017/0030228 A1* | 2/2017 | Jordan, Jr. | F01K 23/101 |
| 2017/0058784 A1* | 3/2017 | Vandale | F02C 9/18 |
| 2018/0080347 A1* | 3/2018 | Yanosik | F01K 23/101 |

\* cited by examiner

FIG. 1 – Prior Art

AIR LOGIC CONTROL FOR AUXILIARY AIR INJECTION SYSTEM

CROSS-REFERENCE TO RELATED APPLICATIONS

This application claims priority to U.S. Provisional Patent Application Ser. No. 62/432,378, filed on Dec. 9, 2016.

TECHNICAL FIELD

The invention relates generally to electrical power systems, including generating capacity of a gas turbine, and more specifically to systems and methods for improving life of the gas turbine and reducing start-up time of the gas turbine engine.

BACKGROUND OF THE INVENTION

Gas turbine engines are commonly used in land-based power plants for generating electricity. A representative simple cycle gas turbine engine 100 is shown in FIG. 1. These land-based power plants take atmospheric air into a compressor 102, increase its pressure through a compression process, mix fuel 104 with the compressed air in one or more combustors 106 and ignite the mixture to generate hot combustion gases. The hot combustion gases which drive a turbine 108 that is coupled to the compressor 102. The mechanical work from the gas turbine engine 100 is used to drive a generator 110 for producing electricity. The exhaust from the gas turbine engine 100 can be vented to the atmosphere through exhaust region 112 or used for producing steam in a heat recovery steam generator 114, when operating in a combined cycle mode.

Gas turbine engines typically raise the operating temperature and pressure of air from ambient conditions to approximately 700 deg. F. and 200-250 psi. The compressed air is then passed to one or more combustors where fuel is added and the fuel-air mixture is ignited, creating hot combustion gases having temperatures over 2000 deg. F. In order to preserve the components in the turbine section that are exposed to these high temperatures, it is often times necessary to actively cool certain parts such as the stationary turbine vanes and rotating turbine blades. Cooling fluid such as a portion of the air from the compressor 102 is often directed to the turbine 108 for purposes of cooling the turbine components. However, removing air from the compressor 102 reduces the amount of air which goes through the combustors 106, thereby adversely affecting gas turbine engine efficiency.

The assignee of the present invention has developed an auxiliary air compression process for use in gas turbine engines, known commercially as TurboPHASE®, and is disclosed in issued U.S. Pat. Nos. 9,695,749, 9,388,737, 9,765,693, 9,803,548, 9,777,630, and co-pending U.S. patent application Ser. Nos. 14/351,245, 14/655,125, 14/462,000, 14/534,347 and 14/329,433, each of which is hereby incorporated by reference. This auxiliary air compression process provides a system and method for improving the overall efficiency of a gas turbine engine through the addition of compressed air generated by a separately fueled air compression process. This air can be directed to the combustion and turbine sections of the gas turbine engine.

Renewable energy is becoming more prevalent in the power generation industry. As the renewable energy penetration in the market increases there is a dynamic balancing act that takes place every day between load, renewable power, and conventional generation. Peak loads are traditionally served by simple cycle gas turbines (SCGT) and combined cycle gas turbines (CCGT). It is preferred that CCGT's are utilized as they are the most efficient form of fossil fuel generation on the electric grid. However, due to the growing supply of renewable energy, the CCGT's are being shut down when solar energy is plentiful, for example, and when the renewable energy is not available, the CCGT's are brought back on line. Unfortunately, CCGT's also have a characteristic that after shutting down, it can take approximately 60-120 minutes to restart. This time is required to mitigate the thermal stresses associated with start-up, such as those in the heat recovery steam generator (HRSG). Also, the gas turbine has a specific ramp rate associated with thermal stresses and clearances for being able to achieve full power.

These thermal constraints on the gas turbine and the HRSG for both SCGT's and CCGT's cause power plants to start operation slowly. Also, during the start-up process, gas turbines are typically "out of compliance" with emissions. Therefore, a shorter start-up time will result in a shorter period of being out of emissions compliance. Most modern gas turbines are equipped with dry low NOx emissions systems that only become "emission compliant" when they operate at 70% load and higher. Consequently, there is a significant amount of emissions that are generated when the gas turbine is started and until it reaches the 70% load point. For example, a typical F-class CCGT will generate emissions equivalent to about one hour of base load power output emissions during start up while generating very little energy to the grid. If this type of plant operates two eight hour shifts with two engine starts and shutdowns per day, then at least two hours of base load emissions generated for every 16 hours of energy being delivered, or almost 15% incremental emissions, are out of compliance.

Some gas turbine original equipment manufacturers offer a "fast start" CCGT. However, these manufacturers use a separate steam boiler to the power plant to recirculate steam through the steam turbine and the HRSG to keep it warm.

In prior art gas turbines, the gas turbine rotor inlet temperature is controlled to a maximum load, or base load, which results in a particular life of the hot gas path components. The gas turbine rotor inlet temperature is typically referred to as the firing temperature of the gas turbine engine. Typical gas turbines are designed to operate 24,000 equivalent operating hours (EOH) between repair intervals on the hot gas path operation. Harsh running conditions, such as peak firing temperature, gas turbine thermal events (trips) and steam injection accumulate equivalent operating hours faster than the actual run time at the harsh running conditions. The calculation of EOH is equal to or less than actual operating hours.

SUMMARY

The present invention relates to systems and methods for improving the operation of a combined cycle gas turbine engine in order to extend the life of combustion and turbine parts and decrease start-up times and restart times.

In an embodiment of the present invention, a method of operating an auxiliary compressed air injection system in fluid communication with a combined cycle gas turbine engine is disclosed such that predetermined operational goals of the combined cycle gas turbine are achieved. Heated compressed air from the auxiliary compressed air injection system is injected into the gas turbine when the operational goal is to create incremental power output from the gas turbine and heated compressed air is injected simultaneously into the gas turbine and downstream of the turbine when the gas turbine is not operating or in a start-up mode and the operational goal is to reduce start up time for the gas turbine.

In an alternate embodiment of the present invention, a method of operating a combined cycle gas turbine and an auxiliary compressed air injection system driven by a fueled engine is provided where the method is selectable between 1) when the gas turbine is operating, injecting heated compressed air into the gas turbine thereby creating incremental power output from the combined cycle gas turbine; 2) when the gas turbine is not operating or in a start-up mode, injecting heated compressed air simultaneously into the gas turbine and downstream of the turbine resulting in a reduced start up time for the gas turbine; 3) when the gas turbine is not operating or in a start-up mode, circulating steam generated in an auxiliary heat recovery steam generator with a steam turbine system resulting in a reduced start up time for the gas turbine; and 4) when the gas turbine is not operating or in a start-up mode, injecting heated compressed air simultaneously into the gas turbine and downstream of the turbine and circulating steam generated in the auxiliary heat recovery steam generator with a steam turbine system resulting in a reduced start up time for the gas turbine.

In yet another embodiment of the present invention, a method of operating a combined cycle gas turbine and an auxiliary compressed air injection system coupled to a fueled engine, and a valve structure on the fueled engine exhaust, the method of operation selectable between 1) directing all exhaust from the fueled engine to an auxiliary heat recovery steam generator; 2) directing all exhaust from the fueled engine to a recuperator associated with the auxiliary compressed air injection system; and, 3) directing exhaust from the fueled engine to both the auxiliary heat recovery steam generator and the recuperator.

In yet another embodiment of the present invention, a method of operating a combined cycle gas turbine fluidly connected to an auxiliary air injection system is disclosed. A control system is provided where the method of operating comprises governing the heated compressed air being injected into the gas turbine at full power based on the amount of incremental power desired; and governing the amount of air being injected into the gas turbine at less than full power based on select gas turbine limits when incremental power is not desired but lower firing temperatures are desired.

In another embodiment of the present invention a method is disclosed for operating a combined cycle gas turbine, an auxiliary compressed air injection system, and a valve structure, the method operating according to one or more of 1) injecting heated compressed air into the gas turbine when the gas turbine is operating thereby creating incremental power output from the gas turbine; 2) injecting heated compressed air into the gas turbine when the gas turbine is not operating or is in a start-up mode, resulting in a reduced start up time for the gas turbine; 3) injecting heated compressed air downstream of the turbine when the gas turbine is not operating or in a start-up mode, resulting in a reduced start up time for the gas turbine; and, 4) injecting heated compressed air simultaneously into the gas turbine and downstream of the turbine when the gas turbine is not operating or in a start-up mode, resulting in a reduced start up time for the gas turbine.

Other advantages, features and characteristics of the present invention, as well as the methods of operation and the functions of the related elements of the structure and the combination of parts will become more apparent upon consideration of the following detailed description and appended claims with reference to the accompanying drawings, all of which form a part of this specification.

BRIEF DESCRIPTION OF THE SEVERAL VIEWS OF THE DRAWINGS

The present invention is described in detail below with reference to the attached drawing figures, wherein.

DETAILED DESCRIPTION

The present invention relates to methods to operate and control a gas turbine engine in conjunction with an auxiliary compressed air injection system capable of generating additional power from the gas turbine and reducing the time required to start the gas turbine. Embodiments of the present invention are described below with respect to FIGS. 2-4.

Figure 1:
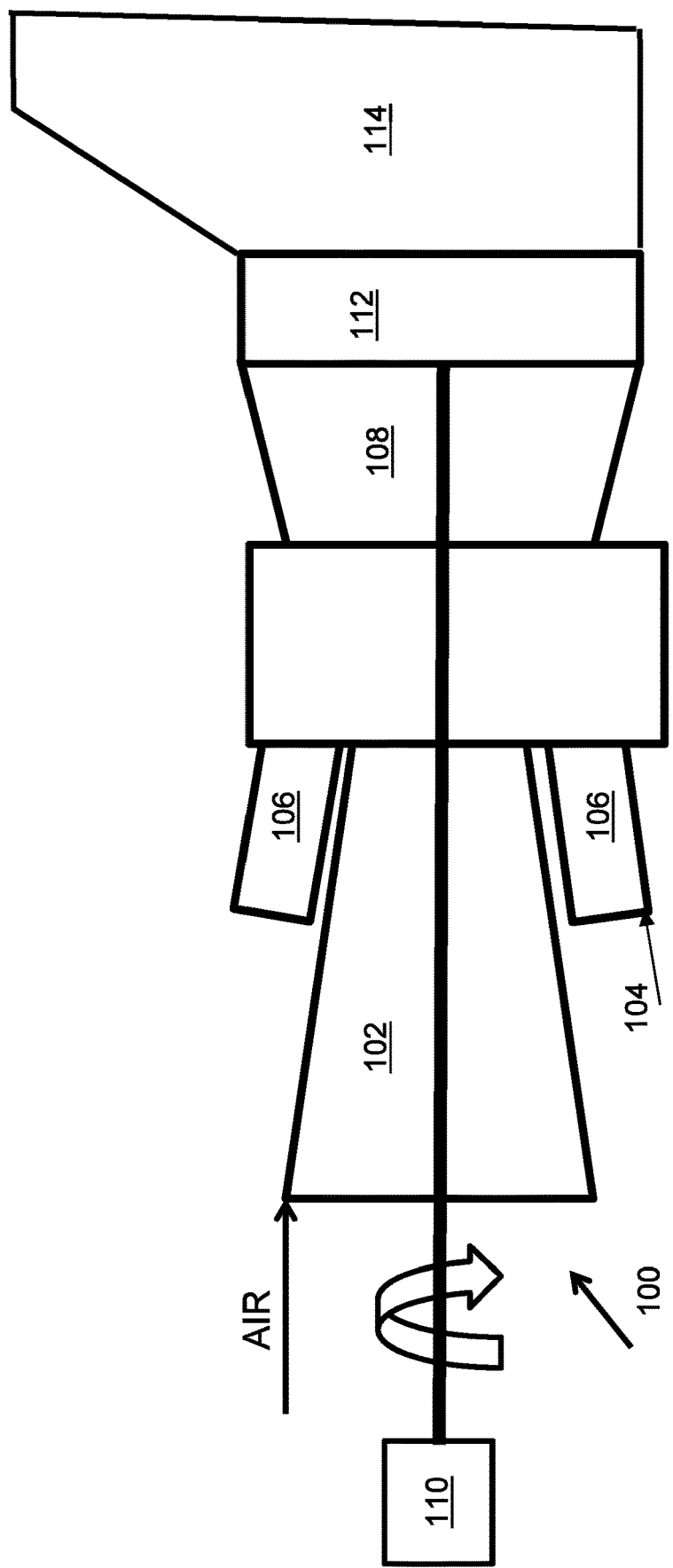
FIG. 1 is a schematic drawing of a gas turbine engine in accordance with the prior art.
Figure 2:
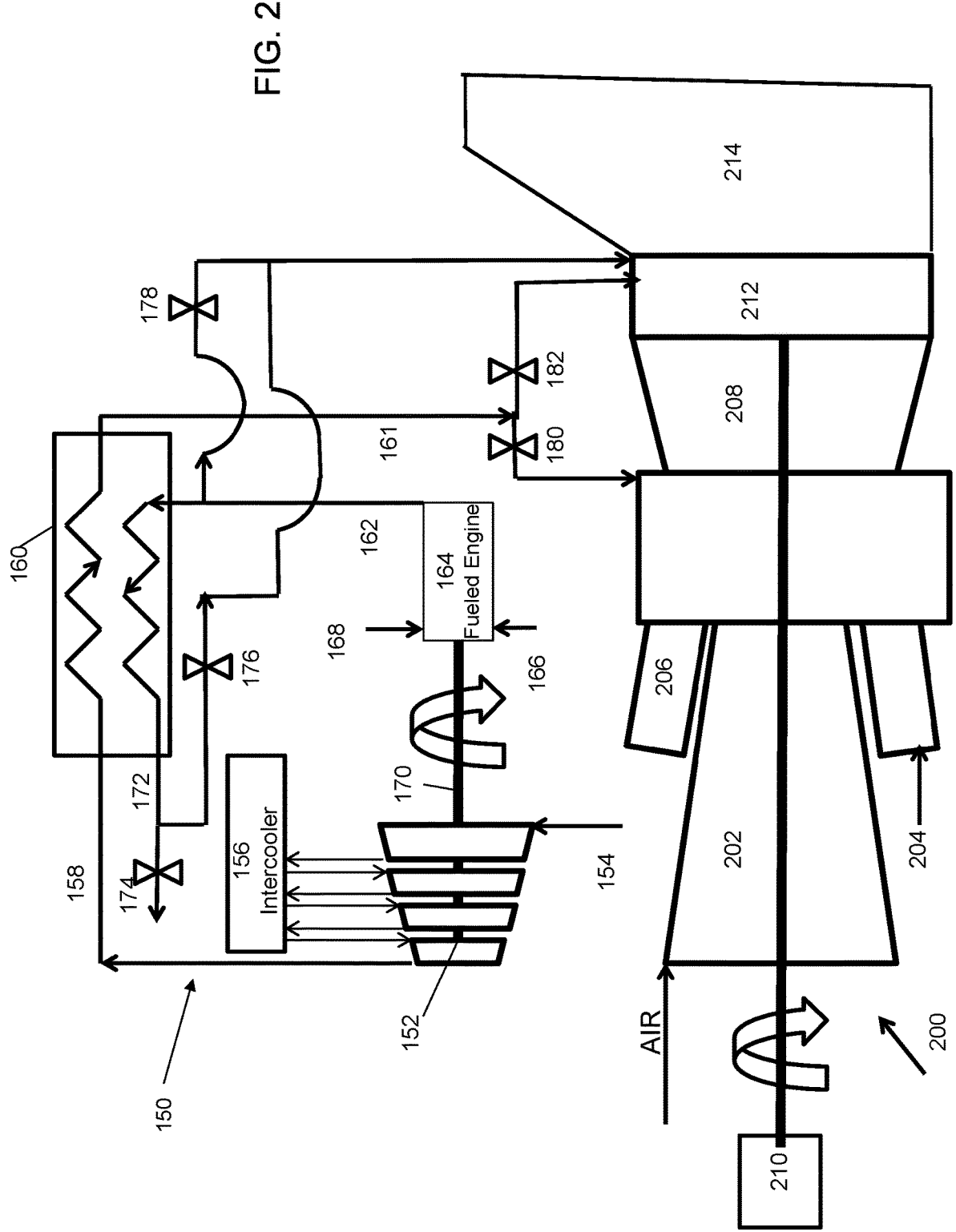
FIG. 2 is a schematic drawing of a gas turbine engine and an auxiliary air compression system in accordance with an embodiment of the present invention.

Referring initially to FIG. 2, the auxiliary compressed air injection system 150 comprises an auxiliary compressor 152 for receiving air 154, which has preferably not been previously compressed. The air 154 is compressed through multiple stages of the auxiliary compressor 152 and intercooler 156. The compressed air 158 passes to a recuperator 160. The recuperator 160 receives waste heat from exhaust 162 of fueled engine 164. The fueled engine 164 receives ambient air 166 and engine fuel 168 and creates power to turn a shaft 170, which is coupled to the auxiliary compressor 152. The exhaust 162 can be used for multiple purposes. First, the exhaust 162, or waste heat, can be passed to the recuperator 160 where it heats the compressed air 158. The remaining waste heat 172 can be vented to the atmosphere through an exhaust valve 174. Instead of venting all waste heat 172 to the atmosphere, it is also possible to direct part of the waste heat 172 to the exhaust portion 212 of the gas turbine 200 by directing it through an exhaust valve 176. In the event not all exhaust 162 is needed for the recuperator 160, it is possible to direct the exhaust to flow through an exhaust valve 178, after which the waste heat can pass through the exhaust portion 212 of the gas turbine 200 or also be used in the heat recovery steam generator 214. The heated compressed air 161 from recuperator 160 can flow through either air valve 180 and into the compressor discharge case or through air valve 182 and into the exhaust portion 212.

As discussed in detail above, FIG. 2 depicts an embodiment of an auxiliary compressed air injection system 150. Hot compressed air, typically 650-700 deg. F. is generated by the system 150 and injected into the gas turbine 200 while exhaust from the separately fueled engine 164 is delivered to the gas turbine exhaust 212 to go through the heat recovery steam generator. As one skilled in the art will understand, there are many different ways and methods to connect an air supply to a gas turbine to increase mass flow going through the combustor, which generates incremental power increases. The above-described system produces increased power in the gas turbine due to the incremental mass flow increase through the gas turbine. When this mass flow is combined with exhaust from the gas turbine engine, additional steam is also produced. The auxiliary compressed air injection system 150 is modular and, in general, adds approximately 5% incremental mass air flow to the gas turbine, which produces 10% incremental power. In an embodiment of the present invention, a 2 MW reciprocating engine is used and produces approximately 12 lb/sec of mass flow per module, which generates an incremental 5.4 MW of power on a CCGT or 4.5 MW on a SCGT.

A representation of the modes of operation for a CCGT, including an auxiliary compressed air injection system of FIG. 2, is shown in Table 1 below.

the gas turbine through normal air injection lines connected to the gas turbine. The temperature of this heated air can be regulated to any temperature from 220 deg. F. to approximately 700 deg. F., depending on the amount of exhaust passed to the recuperator. If all of the exhaust is passed through the recuperator, the compressed air delivered to the gas turbine will be about 700 deg. F. If all of the exhaust is diverted around the recuperator, then the compressed air delivered to the gas turbine will be about 220 deg. F. Instrumentation in the gas turbine can be used to measure parameters such as temperatures, pressures, or clearances, which can then be used to determine if the gas turbine is at the desired condition.

TABLE 1

| Mode | Gas Turbine Status | Air Valve 180 | Air Valve 182 | Exhaust Valve 176 | Exhaust Valve 178 | Exhaust Valve 174 | Result |
|---|---|---|---|---|---|---|---|
| Fast cold Start (option 1) | Turning gear | Open | Closed | Closed | Open | Closed | Warm air in GT & Hot exhaust in HRSG |
| Fast Restart (option 1) | Turning gear | Open | Closed | Closed | Open | Closed | Warm air in GT & Hot exhaust in HRSG |
| Fast cold Start (option 2) | Turning gear | Open partial | Open Partial | Closed | Open | Closed | Warm air in GT and HRSG & Hot exhaust in HRSG |
| Air Injection | Operating | Open | Closed | Closed | Closed | Open | Hot air to GT, warm exhaust to atmosphere |
| Air Injecion | Operating | Open | Closed | Open | Closed | Closed | Hot air to GT, warm exhaust to HRSG |

Figure 3:
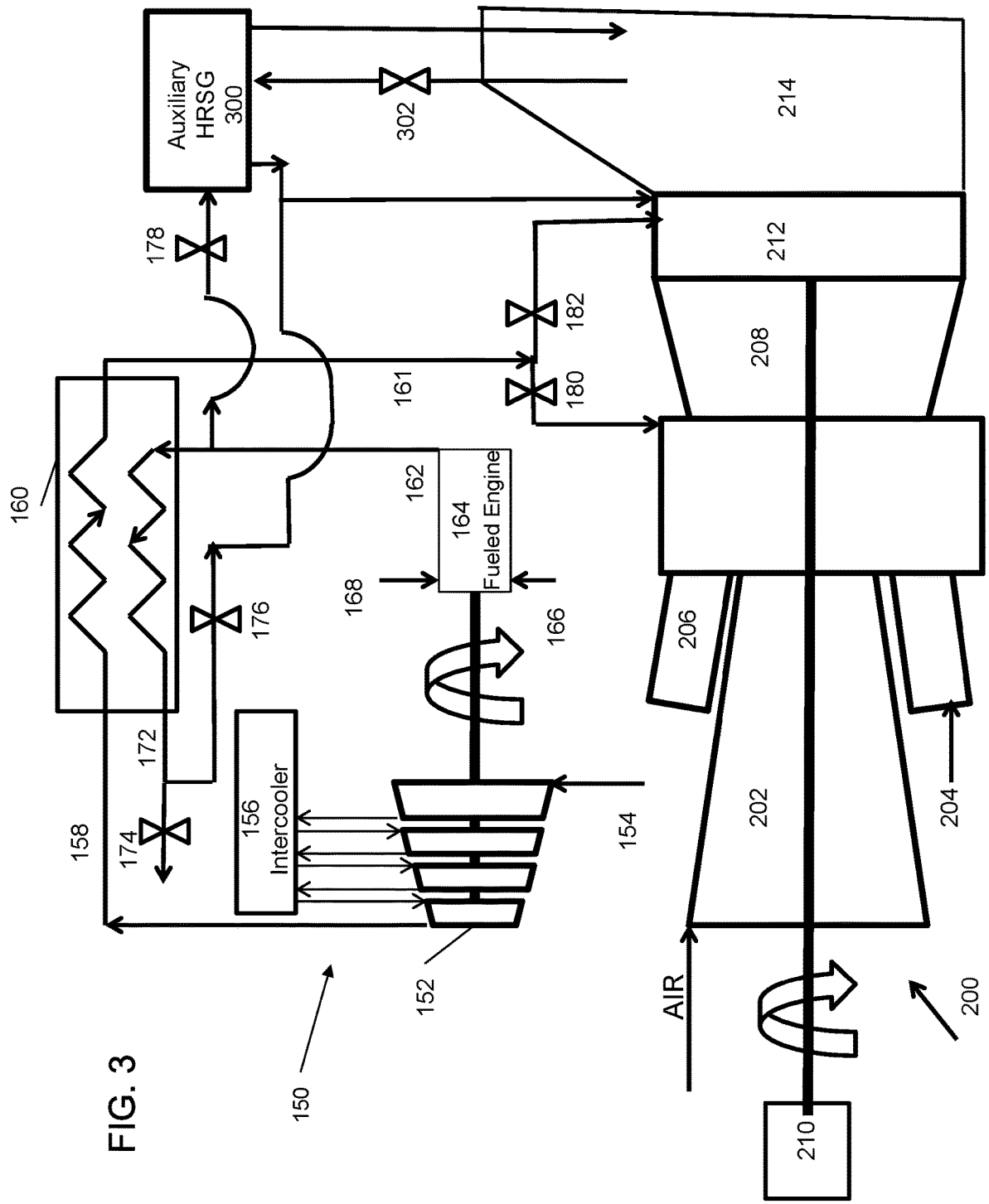
FIG. 3 is a schematic drawing of a gas turbine engine and an auxiliary air compression system in accordance with an alternate embodiment of the present invention.

Referring now to FIG. 3, an alternate embodiment of the present invention is depicted. The embodiment of FIG. 3 is similar to that shown in FIG. 2, except that instead of exhaust from the fueled engine 164 only being directed to the recuperator 160 or the gas turbine exhaust 212, the exhaust can be directed to an auxiliary heat recovery steam generator 300. Steam from the auxiliary heat recovery steam generator 300 can flow into the heat recovery steam generator 214. A steam valve 302 regulates the flow of steam from the heat recovery steam generator 214 of the gas turbine engine 200 to the auxiliary heat recovery steam generator 300. The waste heat from the auxiliary heat recovery steam generator 300 can also be discharged from the system through the gas turbine exhaust 212.

When the gas turbine is offline and it is desired to keep it warm, or to warm it from a cold condition, the auxiliary compressed air injection system 150 is operable to generate the necessary air and/or steam. Since the gas turbine is not operating, the injection pressure is low, almost at atmospheric pressure. The heated compressed air from the auxiliary compressed air injection system can be delivered to In this embodiment of the present invention, when the exhaust from the fueled engine is diverted around the recuperator, the exhaust goes to the auxiliary heat recovery steam generator 300 and can be used to generate steam. This steam can be used to reduce the start time of the CCGT by directing the steam to the steam turbine (not shown) or the heat recovery steam generator 214.

For this embodiment of the present invention, there are multiple interfaces to the CCGT that can be selectively preheated, to keep the CCGT warm and reduce start time. Heated compressed air can be injected into the gas turbine, the heat recovery steam generator or heated air and exhaust can be injected into the heat recovery steam generator while steam is being generated and is used to preheat and/or keep the steam turbine warm.

A representation of the modes of operation for a CCGT including an auxiliary compressed air injection system and an auxiliary heat recovery steam generator having the above-referenced system of FIG. 3 are shown in Table 2 below.

TABLE 2

| Mode | GT Status | Air Valve 180 | Air Valve 182 | Exhaust Valve 176 | Exhaust Valve 178 | Exhaust Valve 174 | Steam valve 302 | Result |
|---|---|---|---|---|---|---|---|---|
| Fast cold Start (option 1) | Turning gear | Open | Closed | Closed | Open | Closed | Open | Warm air in GT & Hot steam in HTSG |
| Fast Restart | Turning | Open | Closed | Closed | Open | Closed | Open | Warm air in |

TABLE 2-continued

| Mode | GT Status | Air Valve 180 | Air Valve 182 | Exhaust Valve 176 | Exhaust Valve 178 | Exhaust Valve 174 | Steam valve 302 | Result |
|---|---|---|---|---|---|---|---|---|
| (option 1) | gear | | | | | | | GT & Hot steam in HRSG |
| Fast cold Start (option 2) | Turning gear | Open partial | Open Partial | Closed | Open | Closed | | Warm air in GT and HRSG & Hot steam in HRSG |
| Air Injection | Operating | Open | Closed | Closed | Closed | Open | Closed | Hot air to GT, warm exhaust to atmosphere |
| Air Injection | Operating | Open | Closed | Open | Closed | Closed | Closed | Hot air to GT, warm exhaust to HRSG |

The present invention provides a method of operating an auxiliary compressed air injection system 150 in fluid communication with a combined cycle gas turbine 200 to achieve predetermined operational goals, such as reduced start-up time of the gas turbine. Start-up time is reduced when components of the gas turbine are kept at elevated temperatures, thereby reducing the time required to achieve operational temperature. The combined cycle gas turbine 200 comprises a compressor 202, one or more combustors 206, a turbine 208, a turbine exhaust 212, and a heat recovery steam generator 214 fluidly connected to each other. The auxiliary compressed air injection system 150 has a fueled engine 164 coupled to an auxiliary compressor 152 for heating air from the auxiliary compressor 152 with waste heat 162 from the fueled engine 164. The method comprises injecting heated compressed air 161 from the auxiliary compressed air injection system 150 into the gas turbine 200 when the operational goal is to create incremental power output from the gas turbine 200. However, when the gas turbine is not operating or is in a start-up mode and the operational goal is to reduce start up time for the gas turbine, the process injects heated compressed air simultaneously into the gas turbine 208 and downstream of the turbine 200. In an embodiment of the invention, the exhaust 162 from the fueled engine 164 is added into the combined cycle gas turbine downstream of the turbine 208, via the exhaust valve 178.

One such measurement to be used to determine if the operational goals have been met is through gauge pressure. In this embodiment of the present invention, a gauge pressure in the auxiliary compressed air injection system 150 at the point of injection into the gas turbine 200 is lower when the gas turbine 200 is not operating than when the gas turbine 200 is operating. Another measurement that can be used is measuring the mass flow in the auxiliary compressed air injection system 150 at the point of injection into the gas turbine 200. The mass flow is higher when the gas turbine 200 is not operating than when the gas turbine 200 is operating.

In an alternate embodiment of the present invention, a method of operating a combined cycle gas turbine 200 is disclosed. The CCGT 200 comprises a compressor 202, one or more combustors 206, turbine 208, turbine exhaust 212 and a heat recovery steam generator 214 fluidly connected to each other and an auxiliary compressed air injection system 150 driven by a fueled engine 164 where the method is selectable between, when the gas turbine 200 is operating, injecting heated compressed air 161 into the gas turbine 200, thereby creating incremental power output from the combined cycle gas turbine 200. When the gas turbine 200 is not operating or is in a start-up mode, heated compressed air 161 is injected simultaneously into the gas turbine 200 and downstream of the turbine (turbine exhaust 212) resulting in a reduced start up time for the gas turbine 200; when the gas turbine 200 is not operating or is in a start-up mode, circulating steam generated in an auxiliary heat recovery steam generator 300 with a steam turbine system resulting in a reduced start up time for the gas turbine 200. When the gas turbine 200 is not operating or is in a start-up mode, heated compressed air can be injected simultaneously into the gas turbine 200 and downstream of the turbine 208 and circulating steam generated in the auxiliary heat recovery steam generator 300 with a steam turbine system resulting in a reduced start up time for the gas turbine 200. In one particular embodiment, the exhaust 162 from the fueled engine 164 is added to the gas turbine 200 downstream of the turbine 208.

In yet another embodiment of the present invention, a combined cycle gas turbine 200 having a compressor 202, one or more combustors 206, a turbine 208, a turbine exhaust 212 and a heat recovery steam generator 214 are fluidly connected to each other with an auxiliary compressed air injection system 150 coupled to a fueled engine 164. A series of valves 174, 176, 178, 180, and 182 provide the ability to direct exhaust from the fueled engine in a way to reduce start-up time for the gas turbine 200. In this operating process, all exhaust can be directed from the fueled engine to an auxiliary heat recovery steam generator 300. Alternatively, all exhaust can be directed from the fueled engine 164 to a recuperator 160 associated with the auxiliary compressed air injection system. Also, exhaust 162 from the fueled engine 164 can be directed to both the auxiliary heat recovery steam generator 300 and the recuperator 160.

The present invention also provides a method of operating a combined cycle gas turbine 200 fluidly connected to an auxiliary compressed air injection system 150, the combined cycle gas turbine 200 comprises a compressor 202, one or more combustors 206, a turbine 208, a turbine exhaust 212 and a heat recovery steam generator 214 fluidly connected to each other. The auxiliary compressed air injection system 150 comprises an auxiliary compressor 152 driven by a fueled engine 164 where waste heat 162 from the fueled engine 164 is used to heat air 158 from the auxiliary compressor 152, and a control system for regulating a flow of the heated compressed air. In operation, the control system governs the amount of heated compressed air 161 injected into the gas turbine 200 at full power based on the amount of incremental power desired. The control system also governs the amount of air injected into the gas turbine 200 at less than full power based on select limits to gas turbine 200 when incremental power is not desired but lower firing temperatures are desired.

With respect to the control system, a system is provided for operating a gas turbine 200 fluidly connected to an auxiliary compressed air injection system 150, where the control system utilizes an amount of air injected from the auxiliary compressed air injection system 150 and reduction in firing temperature to calculate effective operating hours of the gas turbine as a function of actual operating hours. That is, based on the improved start-up times and warming provided through the present invention, the effective operating hours of the gas turbine 200, which determine maintenance intervals, repairs, and replacements, are actually reduced compared to the actual hours. That is, due to the reduced start-up times and engine warming, the effective hours operating are less than the actual hours as the start-up sequences are less impactful on the life of the gas turbine components.

In yet another embodiment of the present invention, an alternate method is provided for operating the combined cycle gas turbine. The combined cycle gas turbine 200 comprises a compressor 202, one or more combustors 206, a turbine 208, a turbine exhaust 212 and a heat recovery steam generator 214 fluidly connected to each other and an auxiliary compressed air injection system 150 having an auxiliary compressor 152 coupled to a fueled engine 164, where waste heat from the fueled engine 164 is used to heat compressed air from the auxiliary compressor 152. A valve structure for regulating this air flow and exhaust gas flow is also provided. In this embodiment, operation occurs according to one or more of injecting heated compressed air 161 into the gas turbine 200 when the gas turbine 200 is operating, thereby creating incremental power output from the gas turbine 200. Also, heated compressed air 161 can be injected into the gas turbine 200 when the gas turbine 200 is not operating or in a start-up mode, resulting in a reduced start up time for the gas turbine 200. Heated compressed air 161 is also injected downstream of the turbine 208 when the gas turbine 200 is not operating or in a start-up mode, in order to preheat components, resulting in a reduced start up time for the gas turbine. Finally, heated compressed air 161 is injected simultaneously into the gas turbine 200 and downstream of the turbine 208 when the gas turbine 200 is not operating or in a start-up mode, in order to preheat components, resulting in a reduced start up time for the gas turbine.

Figure 4:
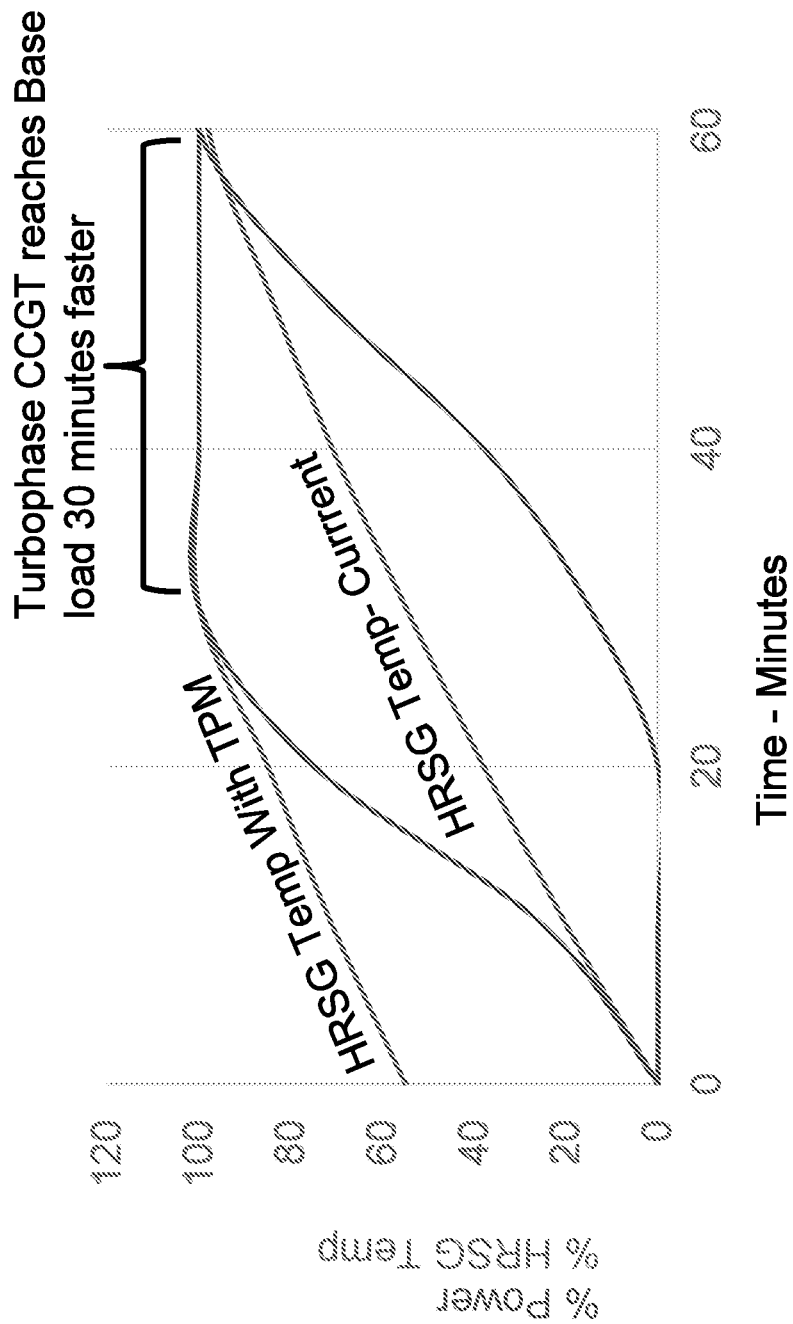
FIG. 4 is a chart depicting the improved start up time for a gas turbine in accordance with an embodiment of the present invention.

The improved start-up time for the combined cycle gas turbine 200 can be best be seen in FIG. 4, where the temperature rise of the heat recovery steam generator 214 is shown versus time for CCGT's with and without heated air from the auxiliary compressed air injection system. For the configurations disclosed in the application herein, by utilizing the auxiliary compressed air injection system, the time required for the gas turbine to reach base load (max operating condition) is about 30 minutes faster than the normal 60 minute start-up cycle.

As those skilled in the art will readily appreciate, each of the embodiments of the present invention may also include flow control valves, backflow prevention valves, and shut-off valves as required to insure that the flow of air, auxiliary compressed air, and compressor discharge air flow only in the directions described herein. While the particular systems, components, methods, and devices described herein and described in detail are fully capable of attaining the above-described objects and advantages of the invention, it is to be understood that these are but embodiments of the invention and are thus representative of the subject matter which is broadly contemplated by the present invention. The scope of the present invention fully encompasses other embodiments which may become obvious to those skilled in the art, and that the scope of the present invention is accordingly to be limited by nothing other than the appended claims. It will be appreciated that modifications and variations of the invention are covered by the above teachings and within the purview of the appended claims without departing from the spirit and intended scope of the invention.

The invention claimed is:

1. A method of operating an auxiliary compressed air injection system in fluid communication with a combined cycle gas turbine to achieve predetermined operational goals of the combined cycle gas turbine, the combined cycle gas turbine comprising a compressor, combustor, turbine, turbine exhaust, the turbine exhaust having a turbine exhaust section, and a heat recovery steam generator fluidly connected to each other and the auxiliary compressed air injection system having a fueled engine coupled to an auxiliary compressor for heating air from the auxiliary compressor with waste heat from the fueled engine, the method comprising:
   increasing gas turbine power output while operating the gas turbine by injecting heated compressed air from the auxiliary compressed air injection system into the gas turbine; and,
   reducing gas turbine start up time while operating the gas turbine in a start-up mode by injecting heated compressed air simultaneously into the gas turbine and into the turbine exhaust section;
   wherein mass flow in the auxiliary compressed air injection system at a point of injection into the gas turbine is higher when the gas turbine is not operating than when the gas turbine is operating.

2. The method of claim 1, wherein exhaust from the fueled engine is added into the combined cycle gas turbine downstream of the turbine.

3. The method of claim 1, wherein a gauge pressure in the auxiliary compressed air injection system at the point of injection into the gas turbine is lower when the gas turbine is not operating than when the gas turbine is operating.

4. A method of operating a combined cycle gas turbine comprising a compressor, combustor, turbine, turbine exhaust, the turbine exhaust having a turbine exhaust section, and a heat recovery steam generator fluidly connected to each other and an auxiliary compressed air injection system driven by a fueled engine, the auxiliary compressed air injection system comprising an auxiliary heat recovery steam generator and a recuperator, the method comprising:
   increasing power output of the combined cycle gas turbine while operating the gas turbine by injecting heated compressed air into the gas turbine; and
   reducing gas turbine start-up time by injecting heated compressed air simultaneously into the gas turbine and into the turbine exhaust section, while circulating steam generated in the auxiliary heat recovery steam generator with a steam turbine system;
   wherein exhaust from the fueled engine is passed through the recuperator to heat the heated compressed air while operating the gas turbine, and wherein the steam generated in the auxiliary heat recovery steam generator is created by diverting a portion of the exhaust from the recuperator.

5. The method of claim 4, wherein the exhaust from the fueled engine is added to the gas turbine downstream of the turbine.

6. The method of claim 4, wherein a gauge pressure in the auxiliary compressed air injection system at a point of injection into the gas turbine is lowest when the gas turbine is not operating.

7. The method of claim 4, wherein a mass flow of the auxiliary compressed air injection system at the point of injection into the gas turbine is higher when the gas turbine is not operating or in a start-up mode than when the gas turbine is operating.

8. A method of operating a combined cycle gas turbine fluidly connected to an auxiliary air injection system, the combined cycle gas turbine comprising a compressor, combustor, turbine, turbine exhaust and a heat recovery steam generator fluidly connected to each other, the auxiliary compressed air injection system comprising an auxiliary compressor driven by a fueled engine where exhaust from the fueled engine is used to heat air from the auxiliary compressor through a recuperator, and a control system for regulating a flow of the heated compressed air and a flow of the exhaust, the method comprising:
  controlling an amount of heated compressed air injected into the gas turbine at full power based on an amount of additional gas turbine power desired; and
  controlling an amount of heated compressed air injected into the gas turbine at less than full power;
  wherein the amount of heated compressed air injected into the gas turbine at full power is at a first temperature and the amount of heated compressed air injected into the gas turbine at less than full power is at a second temperature, the first temperature being reached by using the control system to pass all of the exhaust through the recuperator, the second temperature being reached by using the control system to divert a portion of the exhaust from the recuperator, the first temperature being higher than the second temperature.

9. A method of operating a combined cycle gas turbine comprising a compressor, combustor, turbine, turbine exhaust, the turbine exhaust having a turbine exhaust section, and a heat recovery steam generator fluidly connected to each other and an auxiliary compressed air injection system having an auxiliary compressor coupled to a fueled engine where waste heat from the fueled engine is used to heat compressed air from the auxiliary compressor, and a valve structure, the method comprising:
  increasing gas turbine power output while operating the gas turbine by injecting heated compressed air into the gas turbine;
  using the valve structure to switch between a first, second, and third start-up mode;
  wherein:
    the first start-up mode comprises reducing a gas turbine start up time by injecting heated compressed air into the gas turbine;
    the second start-up mode comprises reducing the gas turbine start up time by injecting heated compressed air into the turbine exhaust; and,
    the third start-up mode comprises reducing the gas turbine start up time by injecting heated compressed air simultaneously into the gas turbine and into the turbine exhaust;
  wherein mass flow in the air injection system at a point of injection into the gas turbine is higher when the gas turbine is not operating or in a start-up mode than when the gas turbine is operating.

10. The method of claim 9, wherein the waste heat from the fueled engine is added to the gas turbine downstream of the turbine section.

11. The method of claim 9, wherein gauge pressure in the auxiliary compressed air injection system at the point of injection into the gas turbine is lower when the gas turbine is not operating or in a start-up mode than when the gas turbine is operating.

\* \* \* \* \*